US012578213B2

(12) United States Patent
Abbruzzese et al.

(10) Patent No.: US 12,578,213 B2
(45) Date of Patent: Mar. 17, 2026

(54) SENSOR MOUNTING DEVICE FOR SENSOR TESTING

(71) Applicant: Aptiv Technologies AG, Schaffhausen (CH)

(72) Inventors: Gianmarco Abbruzzese, Dublin (IE); Lukasz Ugarenko, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 304 days.

(21) Appl. No.: 18/457,949

(22) Filed: Aug. 29, 2023

(65) Prior Publication Data

US 2024/0068848 A1 Feb. 29, 2024

(30) Foreign Application Priority Data

Aug. 30, 2022 (EP) ..................................... 22192891

(51) Int. Cl.
*G01D 11/30* (2006.01)
*G01B 5/00* (2006.01)
(Continued)

(52) U.S. Cl.
CPC ........... *G01D 11/30* (2013.01); *G01B 5/0002* (2013.01); *G01D 11/245* (2013.01); *G01M 17/00* (2013.01); *G01N 29/265* (2013.01); *G21C 17/017* (2013.01)

(58) Field of Classification Search
CPC ..... G01D 11/30; G01D 11/245; G01M 17/00; G21C 17/017; G01N 29/265; G01B 5/0002
(Continued)

(56) References Cited

U.S. PATENT DOCUMENTS

| | | | | | |
|---|---|---|---|---|---|
| 6,115,261 | A | * | 9/2000 | Platt | ....................... H05K 3/301 73/431 |
| 7,642,741 | B2 | * | 1/2010 | Sidman | .................. G01C 21/18 318/648 |

(Continued)

FOREIGN PATENT DOCUMENTS

| | | | | |
|---|---|---|---|---|
| CA | 2521790 | A1 | * 3/2006 | ............. F16M 11/14 |
| CN | 110398736 | | 11/2019 | |

(Continued)

OTHER PUBLICATIONS

Kohler et al, Considerations for Future Automotive Radar in the Frequency Range Above 100 GHz, German Microwave Conference Digest of Papers, Berlin, Germany, 2010, pp. 284-287. (Year: 2010).*

(Continued)

*Primary Examiner* — Stephanie E Bloss
*Assistant Examiner* — Kevin C Butler
(74) *Attorney, Agent, or Firm* — Harness, Dickey & Pierce, P.L.C.

(57) ABSTRACT

Disclosed are a sensor mounting apparatus and associated method, e.g. for use in testing of a vehicle sensor in an anechoic chamber. The apparatus features a sensor mounting device for mounting the sensor and a vehicle part mounting device comprised of first, second and third frames. Each frame is movable in a different direction relative to the sensor and each other frame, e.g. either: adjustable forward and back, left and right, up and down, and/or via roll, yaw and pitch. The outermost third frame further includes an attachment means for holding a vehicle part (e.g. a vehicle fascia/bumper) in place and provision for further adjustment of the part relative to the sensor in use, e.g. via a pivot mounting enabling yaw movement.

13 Claims, 6 Drawing Sheets

(51) Int. Cl.

| | | |
|---|---|---|
| *G01D 11/24* | (2006.01) | |
| *G01M 17/00* | (2006.01) | |
| *G01N 29/265* | (2006.01) | |
| *G21C 17/017* | (2006.01) | |

(58) Field of Classification Search
USPC ........................................................ 73/866.5
See application file for complete search history.

(56) References Cited

U.S. PATENT DOCUMENTS

| | | | | |
|---|---|---|---|---|
| 10,455,158 B2 * | 10/2019 | Ristroph | ................. | H04N 23/58 |
| 10,883,863 B2 * | 1/2021 | Pusheck | ............... | G01D 11/245 |
| 11,933,635 B1 * | 3/2024 | Worthey | .............. | F16M 11/041 |
| 2006/0065795 A1 * | 3/2006 | Blackburn | ............. | F16M 13/02 |
| | | | | 248/122.1 |
| 2007/0050138 A1 * | 3/2007 | Morgan | ............... | G01C 21/188 |
| | | | | 701/510 |
| 2007/0050139 A1 | 3/2007 | Sidman | | |
| 2018/0120242 A1 * | 5/2018 | Takahashi | ............ | G01B 21/042 |
| 2018/0255247 A1 * | 9/2018 | Ristroph | ................ | H04N 23/55 |
| 2020/0025785 A1 * | 1/2020 | Zusman | .................. | G01P 21/00 |
| 2020/0053290 A1 * | 2/2020 | Ristroph | ................ | G02B 27/64 |
| 2024/0068848 A1 * | 2/2024 | Abbruzzese | ....... | F16M 11/2057 |
| 2024/0126151 A1 * | 4/2024 | Kamijo | ................ | F16M 11/123 |
| 2025/0137820 A1 * | 5/2025 | Toll | ........................... | F16B 2/10 |

FOREIGN PATENT DOCUMENTS

| | | | | | | |
|---|---|---|---|---|---|---|
| CN | 110398736 | A | * | 11/2019 | ............... | G01S 7/40 |
| CN | 112013233 | | | 12/2020 | | |
| CN | 112013233 | A | * | 12/2020 | ............ | F16M 11/18 |
| CN | 113203996 | | | 8/2021 | | |
| CN | 113203996 | A | * | 8/2021 | ............... | G01S 7/40 |
| CN | 113253218 | | | 8/2021 | | |
| CN | 113253218 | A | * | 8/2021 | ........... | G01S 7/4004 |
| CN | 215986468 | | | 3/2022 | | |
| CN | 215986468 | U | * | 3/2022 | | |
| DE | 102004045801 | | | 12/2005 | | |
| DE | 102004045801 | B3 | * | 12/2005 | ........... | G01B 21/042 |
| JP | 2016136091 | | | 7/2016 | | |
| JP | 2016136091 | A | * | 7/2016 | | |
| JP | 6355027 | B2 | * | 7/2018 | | |
| JP | 6767045 | B2 | * | 10/2020 | ............. | G01B 15/00 |

OTHER PUBLICATIONS

"Extended European Search Report", EP Application No. 22192891.
4, Feb. 28, 2023, 10 pages.
Kohler, et al., "Consideration for Future Automotive Radar in the
Frequency Range Above 100 GHz", Mar. 15, 2010, pp. 284-287.

* cited by examiner

20/H

10

13

14

21

22

24

30

20

SENSOR MOUNTING DEVICE FOR SENSOR TESTING

INCORPORATION BY REFERENCE

This application claims priority to European Patent Application No. EP22192891.4, filed Aug. 30, 2022, the disclosure of which is incorporated by reference in its entirety.

BACKGROUND

Modern vehicles which possess autonomous driving functionality require precise sensing of their immediate environment and beyond to be operated safely. This is often achieved by a variety of sensors, such as one or more radar sensors that are mounted to the vehicle body, e.g. behind a fascia element such as a vehicle bumper.

During the radar integration process (simulation and tests) of the vehicle's design, the process are designed to ensure that the radar fulfils integrated sensor KIPs. Verification and correlation between simulation and test requires precise measurements of radar sensor behaviour, as located behind a fascia, in an anechoic chamber and at a distance from a radar target simulator (RTS). Important aspects for radar integration are, among other things, the placement, shape, thickness, angles and distance of the car body parts (e.g. fascia/bumper) to the sensor. Many tests and simulations are typically performed for studies and calibration.

Testing is undertaken in an isolated environment (e.g. anechoic chamber) where there is good control over target size and other parameters (speed, amplitude, position) to verify radar performance over mechanical tolerances of assembly and to fulfil functional requirements in terms of accuracy and detection range/ability.

Currently, radar sensor tests may be performed by mounting a sensor to a robotic arm and further mounting the fascia in front of the sensor, with a positioning device for setting the distance between radar and fascia in a normal direction, e.g. one degree of freedom for adjustment. Three-dimensional motion of the sensor is articulated by the robot arm but additional movement of the fascia relative to the sensor is restricted.

The test method typically involves the radar sensor unit, mounted on the robotic arm, being moved completely (e.g. azimuth elevation, translation x, y, z) within the range of field of view of the radar to measure the radar detection parameters with the fascia in place. The test is repeated with/without fascia to measure signal degradation.

Existing proposals to increase the range of motion of fascia relative to the sensor/robot arm mount typically include complex configurations that increase cost and weight or can only be controlled by dedicated software.

SUMMARY

The present disclosure provides devices, apparatuses, and methods, including those described in the claims. Implementations are given in the claims, the description, and the drawings.

According to the above, a need has been identified to address shortcomings associated with mounting units for radar test rigs.

A first aspect is outlined according to claim 1 of the appended claims. Broadly, there is provided a sensor mounting apparatus/device for testing comprising a first mounting device for mounting a sensor, and a second mounting device for mounting a vehicle part, wherein the second mounting device is movable in at least three directions relative to the first mounting device. The directions may be selected from: forward and back, left and right, up and down, roll, yaw and pitch.

Implementations of the sensor mounting apparatus and associated method facilitate, in addition to mounting of the sensor, more flexibility and control for verification tests via a mount system for the vehicle part that moves independently from the sensor. Particularly, it may provide a manual and accurate control of fascia (e.g. the vehicle part) position against the sensor (e.g. radar) for at least three degrees of freedom relative to the sensor mount. A particular form may have five degrees of freedom of movement, namely: forward and back, left and right, up and down, yaw and pitch. Some implementations of the disclosed sensor mounting apparatus and associated method may be described in general terms as a "fascia motion frame" because it enables motion of a fascia/vehicle part relative to a sensor by the mechanism of a successive series of frames, each responsible for a degree of movement.

Accordingly, the problems of weight, manual control and cost are solved by an assembly of simple shaped parts that can be made from light materials such as aluminium and plastic. It may be possible to automate, by servo motors or the like, relative movement of the second/vehicle part mounting device but such a configuration will likely add to cost and weight.

The sensor testing apparatus may be in the form of a frame system. For example, the vehicle body part mounting device may be comprised of a first frame located around (or extending from) and moveable relative to the first/sensor mounting element/device (e.g. being a sensor mounting plate for the radar) which is moveable relative to a second frame, that is in turn moveable relative to a third frame. In a preferred form, the third frame provides a forwards/backwards tilt movement relative to the second frame, while the second frame is configured for sideways (left and right) movement relative to the first frame; finally, the first frame is configured for vertical movement (up and down) movement relative to the sensor. However, the functions/order of each frame may be interchanged, so long as each provides a degree of movement.

The third frame may include additional mounting features for supporting (e.g. connecting and/or clipping to) the vehicle part. Such additional mounting features may have further degrees of movement for mounting the vehicle part. For example, the part may be mountable with one or more adjustments toward and away from, relative to, the sensor which provides for yaw adjustment. A further roll adjustment may be implemented.

In general, provision is made for movement of the vehicle part (e.g. fascia, bumper, etc) relative to the sensor mount in any direction including pitch, yaw, roll, e.g. up to six degrees of freedom including three translational motions and three rotational motions. As is known, the classic example of movement in three-dimensional space can entail translational movements forward and back, left and right, and up and down; and rotational movement about the X, Y, and Z axes (defining roll, yaw and pitch respectively).

In one form, the sensor test apparatus comprises a first frame that is moveable up and down relative to a sensor mount (which is in turn attachable to a robotic arm), e.g. by adjustment of a threaded element arranged vertically at one side of the frame, applying force against an adjacent face of the sensor mount, and causing (vertical) guide rods extending from an opposite side of the sensor mount to move through openings in the first frame, thereby enabling controlled translational vertical/up/down movement between the first frame and sensor mount.

In this embodiment, a second frame is provided, moveable left and right (sideways) relative to the first frame and sensor mount, e.g. by adjustment of another threaded member, arranged on a horizontal axis, at one side of the second frame, acting against an adjacent face of the first frame, while (horizontal) guide rods extending from an opposite side of the first frame move through openings in the second frame to enable controlled translational sideways/left/right movement between the second frame and both the first frame and sensor mount.

A third frame may be provided, moveable for pitch rotation relative to the first/second frames and sensor mount, e.g. by adjustment of a rotatable knob, arranged on a horizontal axis, at one side of the third frame, enabling a controlled tilt/pitch movement between the third frame and each of the first/second frame and sensor mount.

Ultimately, the third frame is configured to support a vehicle part that is able to move independently relative to the sensor mount in each of the vertical, sideways and tilting directions indicated above. Alternative configurations may provide for a different selection of movement for each frame, from six possibilities, namely forward and back, left and right, up and down, roll, yaw and pitch.

The frames, at least when viewed from a frontal direction, may be generally concentrically nestled together. In other words, the first frame, which may be the smallest, is surrounded and fits inside the second frame which in turn may be surrounded and fits inside the third frame. From a side elevation perspective the third frame may be located forward from the second frame so it is clear of the guide rods extending between first and second frames which control translational movement.

As already mentioned, the third or outermost frame may include mounting features for a vehicle part and/or additional adjustment elements, e.g. extensible arms from positions at opposing (e.g. upper and lower) edges of the third frame. The arms may extend from a mounting block that is pivotally connected to the third frame, to effectively permit yaw adjustment of the vehicle part relative to a radar middle point.

In a particular form, the sensor mount is a plate connectable from one side (or therethrough) to an articulated robot arm. A sensor, e.g. a radar sensor, is mountable on the other side to transmit away from the robotic arm, in use, towards an RTS.

In some implementations, the disclosed sensor mounting apparatus and associated method may be expressed as a method. The method provides for mounting a vehicle part for independent movement relative to a sensor, where the independent relative movement comprises at least three degrees of freedom selected from: forward and back, left and right, up and down, roll, yaw and pitch.

In one form the sensor is mounted to a sensor mount that is in fixed connection to a robotic arm. The method is used in the context of testing properties of a radar sensor when the vehicle part is disposed between it and a radar target simulator.

BRIEF DESCRIPTION OF DRAWINGS

Illustrative embodiments will now be described with reference to the accompanying drawings in which.

DETAILED DESCRIPTION

The following description presents example embodiments and, together with the drawings, serves to explain principles of the disclosed sensor mounting apparatus and associated method. However, it is not intended that the scope of the disclosed sensor mounting apparatus and associated method is to be limited to the precise details of the embodiments or exact adherence with all features and/or method operations, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "sideways", "upper" and "lower" are used for convenience of explanation usually with reference to the orientation shown in illustrations and are not intended to be ultimately limiting if an equivalent function can be achieved with an alternative dimension and/or direction. Indeed, in the present case a term such as "horizontal" axis or "vertical" axis can be affected by the orientation imposed on the sensor mounting structure by the robotic arm. Therefore, directional terms are relative to each other.

The description herein refers to embodiments with particular combinations of operations or features, however, it is envisaged that further combinations and cross-combinations of compatible operations or features between embodiments will be possible. Indeed, isolated features may function independently as an implementation of the disclosed sensor mounting apparatus and associated method from other features and not necessarily require implementation as a complete combination.

It will be understood that the illustrated embodiments show applications only for the purposes of explanation. In practice, the disclosed sensor mounting apparatus and associated method may be applied to many different configurations, where the embodiment is straightforward for those skilled in the art to implement.

Figure 1:
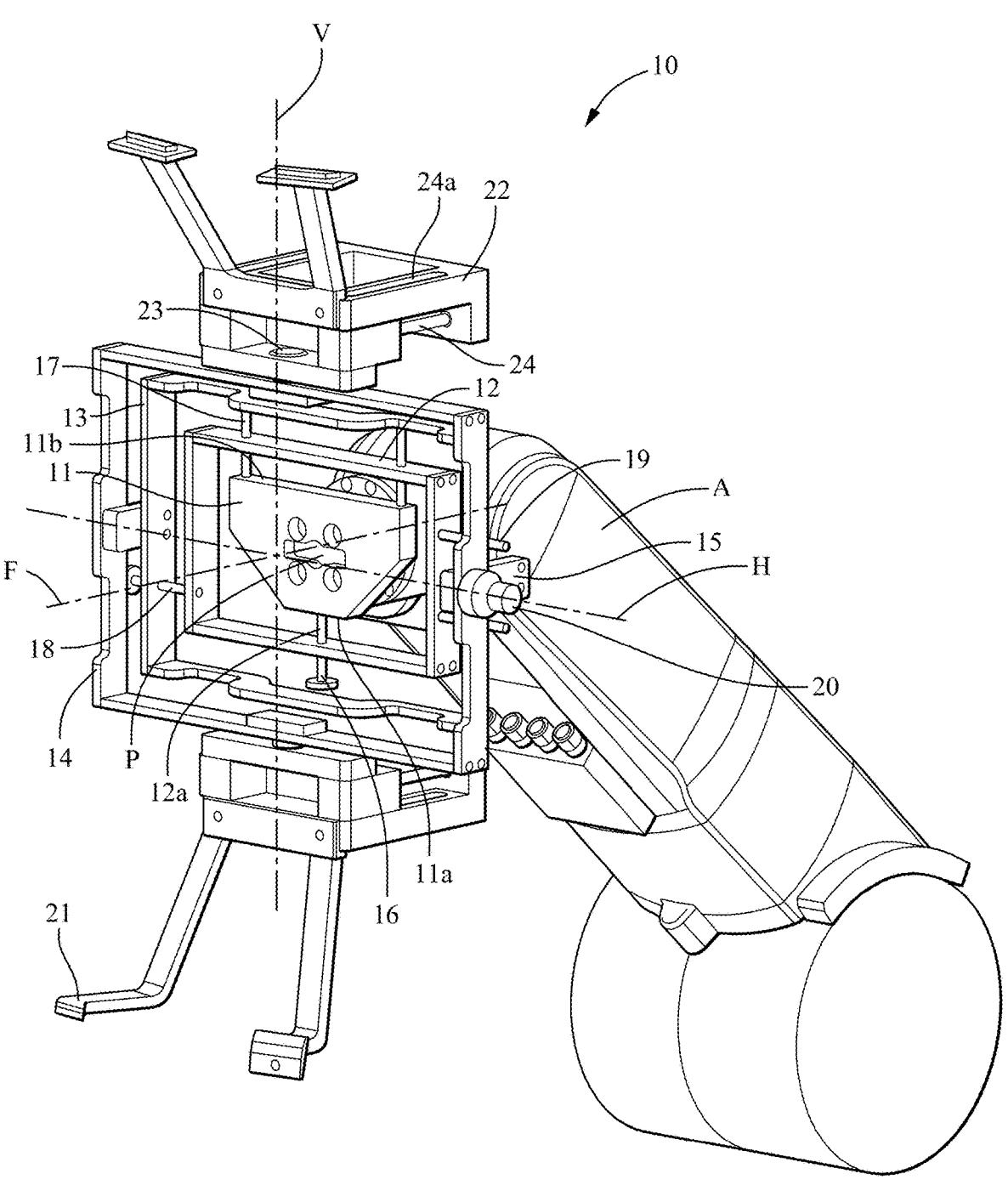
FIG. 1 illustrates a general overview of a first embodiment of sensor testing apparatus.

A sensor testing apparatus according to a first embodiment is illustrated by FIG. 1. The testing apparatus or "test rig", generally denoted 10, is associated with a sensor that would be affixed to mounting plate 11 by suitable fasteners to a robotic arm A. In use, the arm A would be installed in an anechoic chamber at a distance from an RTS, but the details of the testing procedure are not the subject of the present disclosure. Rather, the disclosure relates to the physical construction of the sensor mounting apparatus, that can be used, for example, in a testing situation, namely a mechanism to independently mount a vehicle part (not shown in FIG. 1, e.g. fascia/bumper) relative to a sensor (not shown) attached to the sensor mounting plate 11.

In the illustrated form of FIG. 1, the apparatus primarily consists of three frames surrounding the mounting plate 11 that, combined, are able to move the fascia through at least three degrees of freedom relative to an antenna middle point P (also known as a pivot point). A first innermost frame 12 surrounds the sensor mounting plate 11 and, in this embodiment, is configured for vertical movement relative thereto, while a second mid-frame 13 surrounds the first frame and is, in this embodiment, configured for sideways movement relative thereto (and the sensor mount plate 11).

A third, largest and outermost, frame 14 is, in this embodiment, pivotally connected to brackets 15 extending forwardly from opposing sides of the second frame 13 and configured for adjusting/tilting its pitch about a generally horizontal axis H, relative to the other frames 12/13 and centrally located sensor mount plate 11.

As mentioned, the first frame 12 is moveable up and down relative to the sensor mount 11 (which in turn is attachable to the robotic arm A). Adjustment may be achieved by a first threaded element 16, arranged vertically through one side (in this case the lower edge) of frame 12, via a receiving threaded opening 12a. A proximate end of element 16 acts against an adjacent edge 11a of the sensor mount 11. Force applied via extension of first threaded element 16 through and from first frame 12 causes vertical translation and an increase in the distance between the lower edge of frame 12 and adjacent edge 11a of the sensor mount plate 11.

Translational movement in the vertical direction is controlled by at least two guide rods 17 (unthreaded) extending from the opposite (upper) edge 11b of sensor mount plate 11 through unthreaded openings 12b in an adjacent side/edge of first frame 12. Widening the distance between frame 12 and plate edge 11a at the threaded member side causes a corresponding narrowing of the distance between sensor plate edge 11b and frame 12. Accordingly, controlled translational vertical/up/down movement is achieved between the first frame and sensor mount.

A second frame 13 is provided, moveable left and right relative to the first frame 12 and sensor mount 11, by adjustment of a second threaded member 18 arranged on a horizontal axis at an edge of the second frame 13 (perpendicular to the edge 12b), acting against an adjacent face of the first frame 12. Meanwhile, a second set of guide rods 19, extending from an opposite side edge of the first frame 12 through unthreaded openings (visibility obscured by the third frame 14) in the adjacent edge of the second frame, enable controlled translational sideways/left/right movement between the second frame 13 and, effectively, both the first frame 12 and sensor mount 11.

A third frame 14 is provided, moveable for pitch rotation about the horizontal axis H, relative to the first/second frames (12/13) and sensor mount 11. Pitch adjustment is enabled by a rotatable knob 20 (e.g. which may have markings to indicate angular displacement) arranged on the horizontal axis H, at a vertical side edge of the third frame 14, and controls tilt movement between the third frame 14 and each of the first/second frame (12/13) and sensor mount 11.

The third frame 14 ultimately supports a vehicle part (not shown) via mounting brackets 21 such that it is able to move independently relative to the centralized sensor attached to mount 11. By the combination of frames 12, 13 and 14, the vehicle part is able to be manually adjusted in each of the vertical, sideways and tilting directions.

The third frame may comprise additional adjustment features associated with brackets 21. One such adjustment is a yaw rotation about a vertical axis V, where a part mounting device 22 is pivotally mounted relative to the third frame 14 by a pin/bearing 23. In the illustrated form there are a pair of part mounting devices 22 pivotally mounted to upper and lower side edges respectively of outer frame 14. The part mounting devices 22 move independently of each other relative to frame 14.

A further adjustment capability of part mounting device 22 is a forward/backwards translational movement along an axis F enabled by threaded rods 24 (manually turned by a knob unseen in FIG. 1) causing relative movement of a guide element in a track 24a for control. Such a function enables the vehicle part mounted from brackets 21 to be moved toward and away from the sensor attached to mount 11 and provides a further degree of freedom of movement. Additional movement variations are possible if the part mounting devices 22 are arranged independently and to different parameters, e.g. different pivot angle and/or forward/backwards amount.

A sixth, roll, degree of movement may be possible by incorporating a circular bearing (not shown) into the sensor mounting plate 11, such that the sensor itself is fixed in the centre of the circle to the robot arm A, but the entire framework 10 may be rotated about the front facing axis F about the circular bearing.

The frames, at least when viewed from a frontal direction (see FIG. 2 embodiment), may fit one within the next from smallest to largest, although from a side elevation perspective (see FIG. 3) the third frame 14 may be located forward from the second frame, via bracket 15, so it is clear of the guide rods extending between first 12 and second 13 frames which control translation movement.

FIGS. 2, 3, 4, 5, 6, and 7 illustrate an alternative embodiment that is functionally similar to the first, except in details of the adjustment mechanism for the part mounting device 22. The same reference numerals are otherwise employed where there is a directly correlated function.

Figures 4, 5:
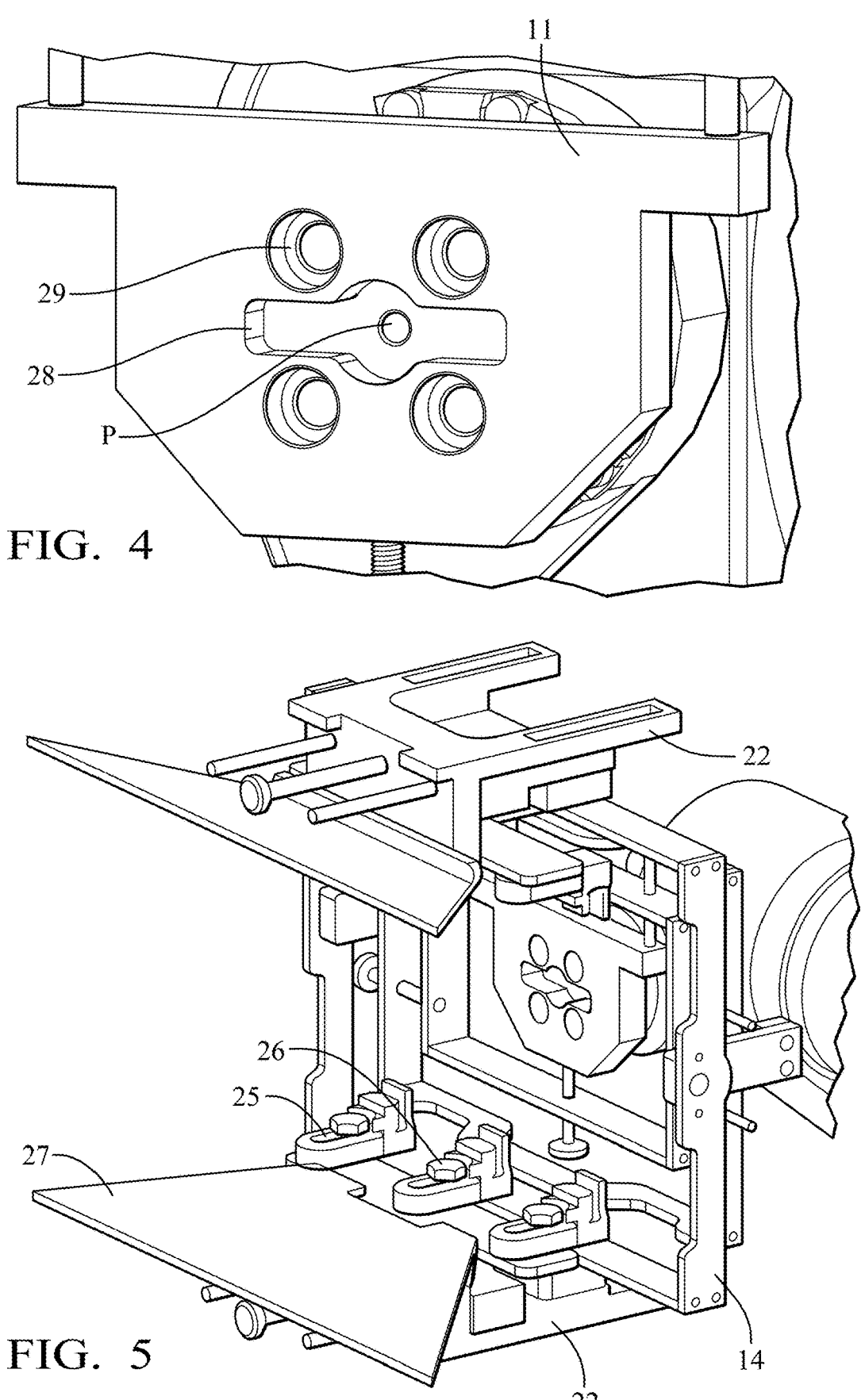
FIG. 4 illustrates a close-up view of a sensor mounting plate.
FIG. 5 illustrates an overview of the second embodiment of sensor testing apparatus from FIGS. 2, 3, and 4.
Figure 6:
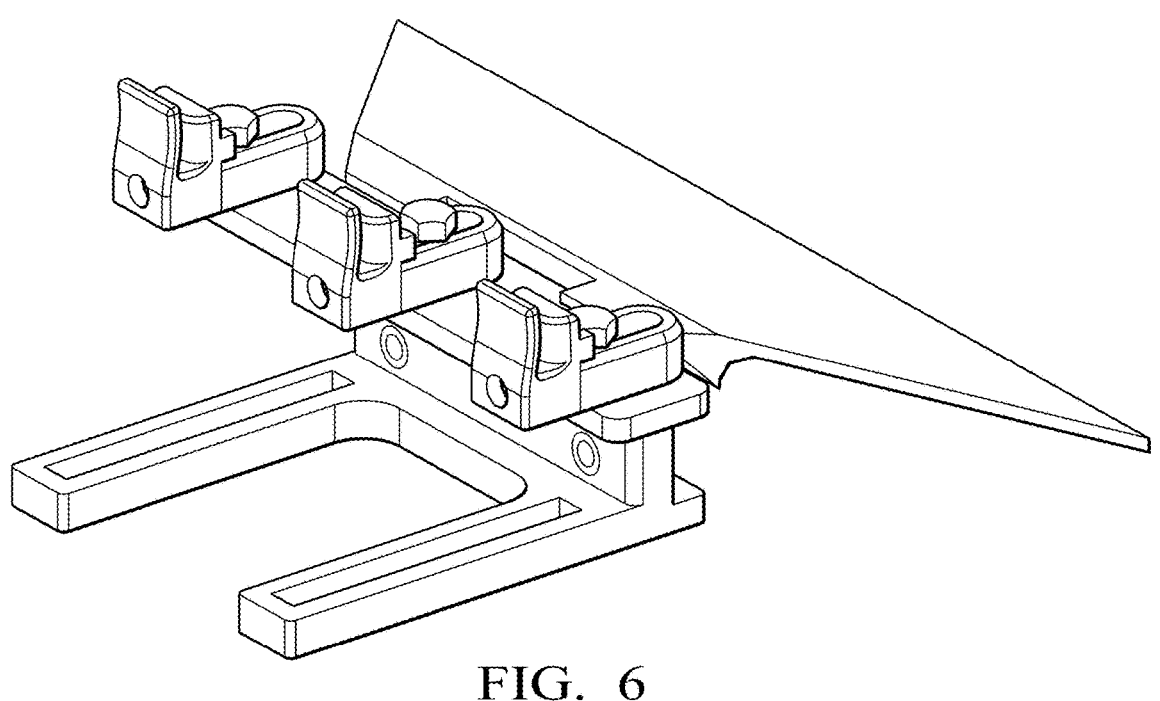
FIG. 6 illustrates a detailed view of a fascia mounting component from the second embodiment of sensor testing apparatus.

In this embodiment the part mounting device 22, best seen in FIG. 5, is adjustably attached to the third frame 14 by a series of slotted brackets 25 (also shown in the part view of FIG. 6). Bolt heads 26 provide for tightening or loosening the relative position of the part mounting device 22, including a yaw adjustment if the bolts are set at different relative positions in their respective slots. An outwardly tapering blade 27 extending outwardly from the sensor mount apparatus may have foam adhered to it or other means of holding a vehicle part in place for use in testing.

Figures 2, 3:
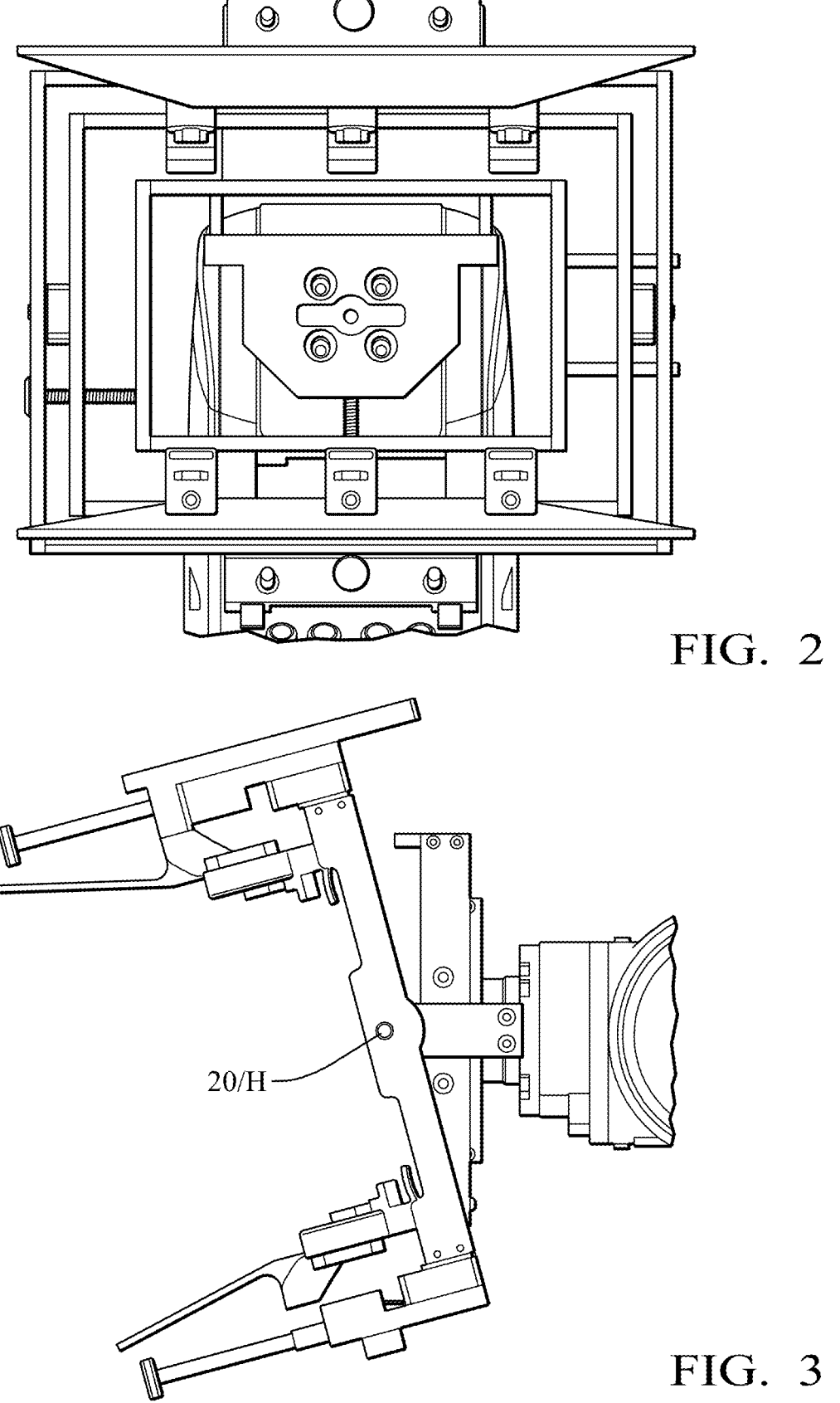
FIG. 2 illustrates a front elevation view of a second embodiment of sensor testing apparatus.
FIG. 3 illustrates a side elevation view of the second embodiment from FIG. 2.

With particular reference to FIGS. 3 and 5, the outer and largest frame 14 effectively has two extending arms, on the top and at the bottom. The frame 14 and these arms control the azimuth tilt (e.g. around H axis) and they include the function, via threaded adjustment, to move the mounted fascia along the F axis (back and forth).

The shape of the fascia may have a strong free form, such that further mounting elements are needed. For example, flexible 3D printed clips that can also take the bent form of complex fascia shapes and be able to fix a position with screws.

The mounting blades 27 in the second embodiment are preferably 3D printed parts, which may be located into countersinks of the part mount 22. As mentioned, these allow absorber material/foam to be glued in place, which may be important for radar performance test and result authenticity.

Referring to FIG. 4, a sensor unit (not shown) may be mounted in use with the mounting plate 11 via an asymmetrical mating shape 28. The shape 28 is located on the front side, whereas the rear side of plate 11 is fixed against the robot arm, e.g. via frontally accessed (four) screw pattern 29. Mating shape 28 ensures the "Poka-Yoke" position of the radar sensor (not shown) to be fool-proofed so that the axes of the device 10 are assured to go through the radar pivot point. The sensor may be mounted to plate 11 by a single screw.

Figure 7:
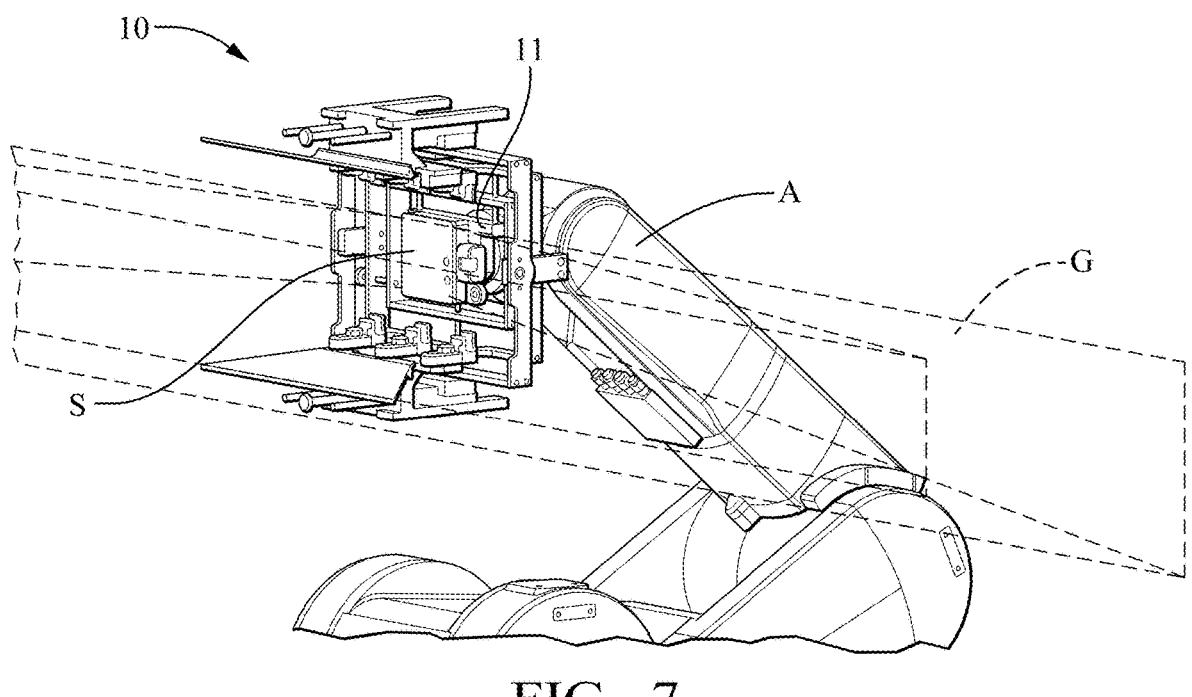
FIG. 7 illustrates a further overview of the second embodiment of sensor testing apparatus from FIGS. 2, 3, 4, 5, and 6, where a robotic arm is visible.

FIG. 7 provides an overview of sensor mounting apparatus 10 in use, as attached to the robotic arm A. A radar sensor S is shown in place on plate 11 at the centre of the apparatus, with frames 12, 13 and 14 cascading outwardly from it. Sensor S sits behind ghost lines G that represent the field of view of the radar.

It will be apparent to a skilled person that robotic arm A can position sensor S where it is needed, relative to an RTS in an anechoic chamber, and spatially fix it at that position. Then, after initial calibration measurements, a vehicle part can be attached to blades 27 (or brackets 21 of FIG. 1) and adjusted to any of a variety of positions relative to the "fixed" sensor S for further measurements to be taken.

Figures 8, 9:
FIG. 8 illustrates an overview of a third embodiment of sensor testing apparatus, in tilted configuration.
FIG. 9 illustrates an overview of the third embodiment, in yaw-adjusted configuration.
Figure 10:
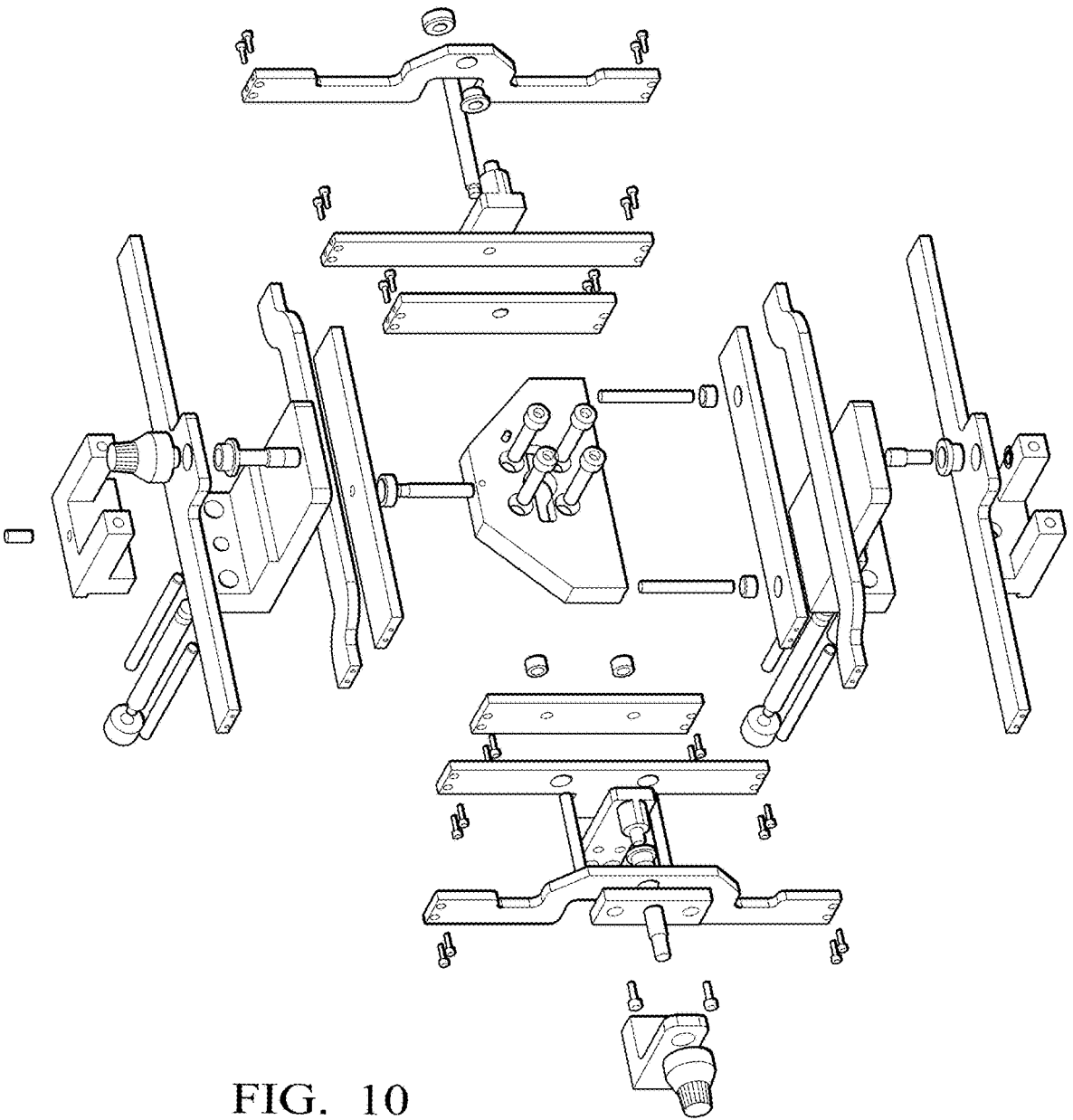
FIG. 10 illustrates an exploded component view of the third embodiment of sensor testing apparatus.

FIGS. 8 to 10 show a third embodiment of testing apparatus 10, with analogous function to the foregoing embodiments, hence common reference numerals are used.

A tilted configuration is shown in FIG. 8, where outer frame 14 has its pitch adjusted (via manual knob 20) relative to mid-frame 13 and the other inner components that are translated in sideways and vertical directions relative to the sensor mount.

FIG. 9 illustrates a variation in execution from previous embodiments in that a yaw adjustment knob 30 is provided for adjusting the angle of a part attachment device 22 relative to the outer frame 14. Furthermore, vehicle attachment features would be affixed to extend forwardly from the device 22 at position 21, e.g. past knob 30. As with other embodiments, a toward and away translational motion for a vehicle part (not shown) relative to a sensor (not shown) is controllable by a threaded member and/or guide rods 24 of the yaw adjustable device 22.

FIG. 10 illustrates a component view of the test rig where it can be seen that each frame may be constructed from multiple sides fixed together by screws to. An assembly procedure will be apparent to a person skilled in the art.

By way of summary, the disclosure can generally be embodied by a sensor mounting apparatus and associated method, e.g. for use in testing of a vehicle sensor in an anechoic chamber (e.g. a radar sensor). The apparatus features a sensor mounting device for mounting the sensor and a vehicle part mounting device, e.g. comprised of first, second and third frames. Each frame is movable in a different direction relative to the sensor and each other frame, e.g. either adjustable: forward and back, left and right, up and down, and/or via roll, yaw and pitch. The outermost frame further includes an attachment means for holding a vehicle part (e.g. a vehicle fascia/bumper) in place and, optionally, provision for further spatial adjustment of the part relative to the sensor in use, e.g. via a pivot mounting enabling yaw movement.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, the use of "preferred," "preferably," and grammatically related terms means that a specified element or technique is more acceptable than another, but not that such specified element or technique is a necessity, unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A sensor testing apparatus comprising:
   a sensor mounting plate for mounting a sensor; and
   a vehicle part mounting device extending from the sensor mounting plate for mounting a vehicle part, the vehicle part mounting device being configured to be movable in at least three different directions relative to the sensor mounting plate,
   wherein the vehicle part mounting device is comprised of a plurality of frames, each frame being movable in a different direction, wherein the moveable direction of each frame includes at least one of: forward and back, left and right, up and down, roll, or yaw and pitch, and
   wherein the plurality of frames includes at least three frames arranged to fit successively inside each other from a largest outermost frame to a smallest innermost frame, wherein the largest outermost frame includes or is coupled to the vehicle part mounting device with attachment features for attaching to a vehicle part.

2. The sensor testing apparatus of claim 1, wherein the vehicle part mounting device comprises at least one additional position adjustment feature coupled to the outermost frame for adjusting a relative position of the vehicle part.

3. The sensor testing apparatus of claim 2, wherein the at least one additional position adjustment feature comprises at least one of:
   a yaw adjustment feature; or
   a translational adjustment feature for moving the vehicle part toward and away from the sensor.

4. The sensor testing apparatus of claim 3, wherein the yaw adjustment feature comprises a pivot pin coupling the vehicle part mounting device to the outermost frame.

5. The sensor testing apparatus of claim 3, wherein the translational adjustment feature comprises a series of fixture elements slidable for fixing a relative position within at least one of slots or a threaded element causing relative movement of a guide element in a track.

6. The sensor testing apparatus of claim 1, wherein a first frame of the plurality of frames is configured for relative movement in a vertical direction relative to the sensor mounting plate.

7. The sensor testing apparatus of claim 6, wherein a second frame of the plurality of frames is configured for relative movement in a sideways direction relative to the sensor mounting plate.

8. The sensor testing apparatus of claim 7, wherein respective frame movement in at least one of the sideways direction or the vertical direction is adjustable by a threaded element.

9. The sensor testing apparatus of claim 8, further comprising at least two guide rods located at an opposite side edge of a respective frame, the guide rods for controlling translational movement.

10. The sensor testing apparatus of claim 1, wherein a third frame of the plurality of frames is configured for relative movement in a tilting direction relative to an antenna pivot point.

11. The sensor testing apparatus of claim 1, wherein the sensor mounting plate comprises a circular bearing for enabling roll movement of the vehicle part mounting device relative to the sensor.

12. The sensor testing apparatus of claim 1, wherein at least one of the directional movements or position adjustment is motorized.

13. The sensor testing apparatus of claim 1, further comprising:

a robotic arm fixed to the sensor mounting plate.

* * * * *